(12) United States Patent
Collet et al.

(10) Patent No.: US 8,484,061 B2
(45) Date of Patent: *Jul. 9, 2013

(54) SCHEDULING SESSIONS OF MULTI-SPEAKER EVENTS

(75) Inventors: Jean-Luc Collet, La Gaude (FR); Beatrice Coulomb, Cagnes sur Mer (FR); Gerard Marmigere, Drap (FR); Carole Truntschka, Saint-Laurent du-Var (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,104

(22) Filed: Sep. 14, 2012

(65) Prior Publication Data

US 2013/0013366 A1 Jan. 10, 2013

Related U.S. Application Data

(63) Continuation of application No. 12/254,135, filed on Oct. 20, 2008.

(30) Foreign Application Priority Data

Oct. 7, 2008 (EP) .................................... 08305650

(51) Int. Cl.
*G06Q 10/00* (2012.01)
(52) U.S. Cl.
USPC ....................................... 705/7.13; 705/7.12

(58) Field of Classification Search
USPC ................................................ 705/7.12, 7.13
See application file for complete search history.

(56) References Cited

U.S. PATENT DOCUMENTS

| | | | |
|---|---|---|---|
| 6,085,166 A | 7/2000 | Beckhardt et al. | |
| 6,781,920 B2 | 8/2004 | Bates et al. | |
| 7,108,173 B1 | 9/2006 | Wang et al. | |
| 2001/0014866 A1 | 8/2001 | Conmy et al. | |
| 2003/0149606 A1 | 8/2003 | Cragun et al. | |
| 2003/0204474 A1 | 10/2003 | Capek et al. | |
| 2006/0106872 A1 | 5/2006 | Leban et al. | |
| 2006/0116918 A1 | 6/2006 | Flora et al. | |
| 2007/0005408 A1 | 1/2007 | Boss et al. | |
| 2008/0162244 A1 | 7/2008 | Oral et al. | |
| 2008/0270211 A1* | 10/2008 | Vander Veen et al. | 705/8 |
| 2008/0294482 A1 | 11/2008 | Bank et al. | |
| 2009/0006161 A1 | 1/2009 | Chen et al. | |

* cited by examiner

*Primary Examiner* — Thomas L Mansfield, Jr.
(74) *Attorney, Agent, or Firm* — Cantor Colburn LLP; Douglas Lashmit (57) ABSTRACT

A method of scheduling events includes receiving event data specifying sessions for an event, an event duration that encompasses a plurality of time slots, a respective duration for each session, a respective start time for the event and the sessions, and information describing a plurality of attendees; generating a first list of each possible set of time slots within which each session can be scheduled based upon the respective start times; generating a second list by removing each possible set of time slots for each session that is less than the duration specified for the session; performing a scheduling process for each session; and sending a respective electronic message presenting the schedule to each attendee.

5 Claims, 8 Drawing Sheets

| Meeting | ID | Subject | Start Time | Duration | Date | Location | Chair | Mandatory | Optional | Inform | Parent | Pred. | Fixed | Type |
|---|---|---|---|---|---|---|---|---|---|---|---|---|---|---|
| M1 | 310 | Cust. X Visit | 8:30 | 20 | 9-8-2007 | None | Carol | None | Andre Betty | All | None | None | Yes | Event |
| M2 | 320 | Welcome | Inherit | 2 | Inherit | Any | Inherit | Jacque | Inherit | Pete | 310 | None | Yes | Sess. |
| M3 | 330 | Innov. Land | 9:30 | Inherit | Inherit | Duffy | Veran | Inherit | Inherit | Inherit | 310 | 320 | Yes | Group |
| M4 | 340 | Near Field Comm. | Inherit | 1 | Inherit | Inherit | Inherit | Inherit | Inherit | Inherit | 330 | Inherit | No | Sess. |
| M5 | 350 | Video on Demand | Inherit | 1 | Inherit | Inherit | Inherit | Inherit | Inherit | Sarah | 330 | Inherit | No | Sess. |
| M6 | 360 | Instant Gaming | Inherit | 1 | Inherit | Inherit | Inherit | Jean | Inherit | Inherit | 330 | 350 | No | Sess. |
| M7 | 370 | Closing | Inherit | 1 | Inherit | Monet | Inherit | Jacque | Inherit | All | 310 | 330 | No | Sess. |

SCHEDULING SESSIONS OF MULTI-SPEAKER EVENTS

CROSS-REFERENCE TO RELATED APPLICATION

This application is a continuation of, and claims priority to, U.S. application Ser. No. 12/254,135 filed on Oct. 20, 2008, claims the benefit of European Patent Application No. 08305650.7, filed Oct. 7, 2008 at the European Patent Office, the disclosure of which is hereby incorporated by reference herein in its entirety.

BACKGROUND

Exemplary embodiments of the present invention relate electronic events management, and more particularly, to scheduling sessions of an event with multiple attendees based on a set of constraints.

The use of calendaring and scheduling technology has grown considerably in the last decade. Nevertheless, meeting scheduling can present an inherently difficult and time-consuming task that requires multiple parties to interact and consult their various calendars to reach an agreement on a mutually acceptable time. The scheduling task becomes more difficult when the meeting is an event such as a conference or an office visit that involves a number of different participants that will be attending a number of sessions or sub-meetings related to different sub-topics, in which attendance is required for certain participants at certain sessions or sub-meetings. Where the scheduling task involves an event that includes multiple sessions or sub-meetings each being organized by separate people and/or encompassing further sub-sessions or sub-meetings, the process becomes even more complex. The scheduling process for an event must take into account numerous constraints that are set by the participants, and as a result, scheduling a meeting or an event can be a lengthy and time consuming process that involves contacting the attendees, soliciting open times from the attendees, identifying free time slots that are acceptable to the attendees, and then notifying the attendees once an appropriate time is found. The overhead involved with scheduling a meeting or an event increases with the number of attendees and other resources that must be coordinated for the event to occur.

Automated software services and tools designed to assist the scheduling process have been developed to attempt to reduce the overhead of scheduling a meeting or an event. Typically, such a service will include a server shared by an organization that provides a common database for storing information related to a calendar of events (for example, meetings, conferences, and other appointments) each member of the organization is scheduled to attend. People wishing to organize meetings can use this shared information to determine whether an appropriate meeting time is available. For example, a scheduling service may allow a user who is organizing a conference (the "chair") to specify a list of mandatory attendees and a list of optional attendees from the organization for a meeting. The scheduling service then determines one or more proposed times that all the mandatory attendees can attend a meeting based on data in the shared electronic calendar stored in the common database for the organization. The proposed times are presented one at a time in chronological order. The scheduling service may also list the optional attendees who are also available to attend each proposed time. The organizer can then select one of the proposed times for the meeting and send a message to each of the attendees inviting them to attend the meeting.

While greatly simplifying the task of finding times when a limited number of persons are available for a conference, existing scheduling services still have drawbacks. For instance, the process of selecting an appropriate meeting time is manual and time consuming. The organizer may have to scan through numerous calendars and across large date ranges to find an appropriate time. Additionally, there are privacy implications that are at odds with publishing private data that involves the whereabouts of an individual in the shared calendar in such an approach.

SUMMARY

An exemplary embodiment of a method of scheduling events having multiple meetings and multiple attendees includes receiving a set of event data specifying a set of sub-meetings for an event including one or more sessions for the event, an event duration that encompasses a plurality of time slots, a respective duration for each sub-meeting, a respective start time for the event and each of zero or more of the sub-meetings, and a set of information describing a plurality of event attendees that includes a respective list of zero or more mandatory attendees for each sub-meeting; generating a first list of each possible set of time slots from the plurality of time slots for each session within which the session can be scheduled based upon the specified lists of zero or more mandatory attendees and the respective start times for the sub-meetings; generating a second list by removing each possible set of time slots from the first list for each session that is less than the duration specified for the session; individually performing a scheduling process for each session that comprises allocating a respective set of time slots for the session in an event schedule, removing each possible set of time slots for the session that is not equivalent to the set of time slots allocated for the session from the second list, and removing each possible set of time slots for each other session that includes at least one time slot allocated for the session in the event schedule from the second list; and sending a respective electronic message presenting the event schedule to each event attendee of the plurality of event attendees.

The shortcomings of the prior art can also be overcome and additional advantages can also be provided through exemplary embodiments of the present invention that are related to computer program products and data processing systems corresponding to the above-summarized method are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

DETAILED DESCRIPTION

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Further, the terms and phrases used herein are not intended to be limiting but rather to provide an understandable description of the invention.

Exemplary embodiments of the present invention described herein can be implemented to provide a mechanism for event management that allows a user to organize and schedule an event, such as a conference with multiple presentations or an office visit, that involves a number of different participants that will be attending a number of sessions or meetings related to different sub-topics, in which attendance is either optional or mandatory for certain of the participants at certain of the meetings, and in which the multiple meetings can each further encompass sub-sessions for which attendance may be either optional or mandatory for certain participants of the meeting. Exemplary embodiments can be further implemented to permit the event-organizing user (that is, "the chair" for the event) to assign a chair for each of the meetings and sub-sessions of the event. In these embodiments, once the event chair has established the initial set of meetings for the event, the assigned chair for each meeting can then utilize the mechanism for event management to organize and schedule the sub-meetings for the meeting to which the chair has been assigned.

Figure 1:
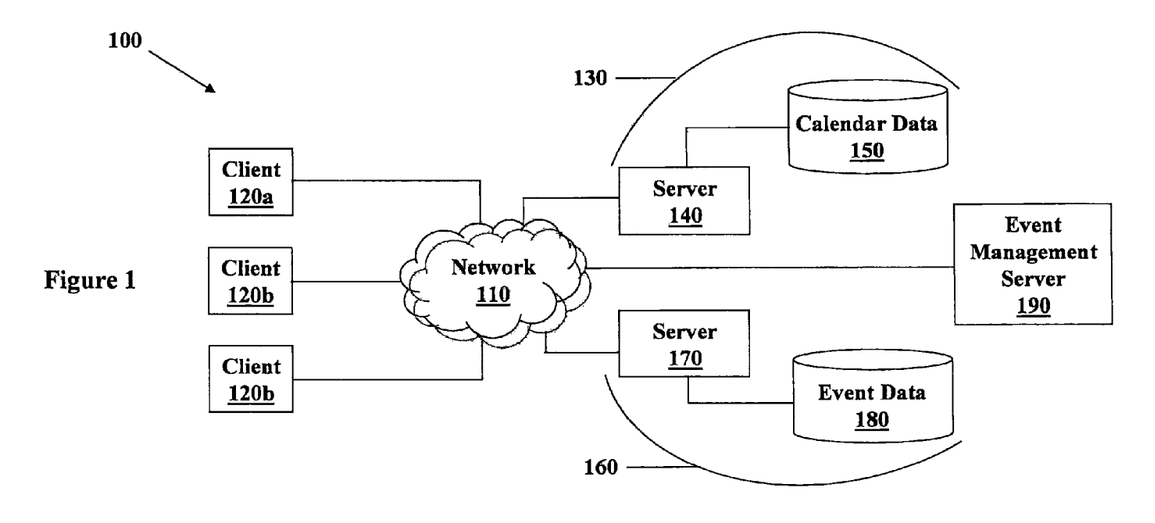
FIG. 1 is a block diagram illustrating an exemplary event organizing system within which exemplary embodiments of the present invention can be incorporated.

Referring now to FIG. 1, an electronic event organizing system 100 within which exemplary embodiments of the present invention can be incorporated is illustrated. As will be described, electronic event organizing system 100 can be utilized for scheduling an event in which a number of different participants will each be attending a number of different sessions or meetings. System 100 includes a network 110, client computers 120c, 120b, 120c (collectively referenced hereinafter as hosts 120), a calendar database system 130, an event database system 160, and an event management server 190.

According to the client-server model of computer process interaction utilized in the present exemplary embodiment, a client process sends a message including a request to a server process, and the server process responds by providing a service. The server process may also return a message with a response to the client process. Often the client process and server process execute on different computer devices, called hosts, and communicate via a network using one or more protocols for network communications. As used herein, the term "server" refers to the process that provides the service, or the host computer device on which the process operates. Similarly, as used herein, the term "client" refers to the process that makes the request, or the host computer device on which the process operates. In addition, a process executing as a server can be broken up to run as multiple servers on multiple hosts (sometimes called tiers) for reasons that include reliability, scalability, and redundancy, but not limited to those reasons.

In the present exemplary embodiment, network 100 can be any network that connects a variety of users of client computers, including, but not limited to, local area networks (LANs), wireless networks, wide-area networks (WAN), the Internet (a network of heterogeneous networks using the Internet Protocol, IP), and virtual private networks. In exemplary embodiments in which electronic event organizing system 100 is a single, stand-alone system, network 110 may be omitted.

Clients 120 are computer devices to which a population of potential participants in events (the "conference population"), or their human agents (for example) secretaries and assistants, have access. Clients 120 are connected to network 110. For the purposes of illustration, three clients 120a, 120b, 120c are shown in FIG. 1. In other exemplary embodiments, more or fewer clients are connected to network 110. In exemplary embodiments in which electronic event organizing system 100 is a single, stand-alone system, only one client is used. Clients 110 can include any device capable of accessing or providing event scheduling information, such as desktop personal computers (PCs), laptops, hand-held personal digital assistants (PDAs), wireless phones, and other devices.

In the present exemplary embodiment, electronic event organizing system 100 includes a calendar database system 130. Calendar database system 130 includes a calendar database server 140 and user calendar data 150 on one or more storage devices. Calendar database server 140 controls the storage and retrieval of user calendar data 150. Calendar database server 140 provides services to allow individual users, who may be persons operating one of clients 120, to maintain individual electronic calendars on system 100. The information regarding each individual electronic calendar is maintained in user calendar data 150. More specifically, user calendar data 150 generally includes one or more data structures that hold data indicating a person from the population and zero or more appointments for that person, including data indicating a start date and time and stop date and time for the appointment. In some embodiments, a description of the appointment, or a location associated with the appointment, or both, are included in the calendar data for each appointment. Individual electronic calendars may also be maintained by calendar database system 130 for physical assets such as conference MOMS.

In exemplary embodiments, the calendaring services provided by calendar database system 130 can be accessed using electronic calendaring applications residing on clients 120. Calendar database server 140 can accept individual electronic calendar appointments for each individual electronic calendar, and each of the accepted appointments may include a start date/time and either a stop time or a duration of the appointment on a particular day or days. Each electronic calendar appointment may also include information describing the location of the scheduled appointment. Calendar database system 130 can be configured such that calendar database server 140 is a shared server that provides user calendar data 150 as a common database for storing and accessing information related to a calendar of events for a group of users of clients 120. Calendar database system 130 can also be configured to allow a user to operate an electronic calendaring application to organize a meeting by specifying a time, a date, a duration, and a list of mandatory attendees and/or optional attendees for the meeting from the users user maintaining an individual electronic calendars on system 100, and send electronic messages notifying each attendee of the meeting and allowing optional attendees to accept or decline participation in the meeting. Calendar database system 130 can further be configured to add an appointment that corresponds to the meeting to the individual electronic calendar of each user specified as a mandatory attendee and each user specified as an optional attendee that accepts participation in the meeting.

For purposes of illustration, calendar database server 140 is depicted as being separate from clients 120; but in other exemplary embodiments, calendar database server 140 can be distributed over or reside in part or in whole on one or more of clients 120. Furthermore, for purposes of illustration, one calendar server 140 is connected to one storage device with user calendar data 150, but in other embodiments, the user calendar data may be distributed over several data storage devices connected directly to one or more calendar database servers like calendar database server 140, or connected indirectly to one or more servers through network 110. Any suitable database system type may be used as calendar database system 130. In exemplary embodiments, system 100 can include more or fewer calendar database systems like system 130.

Electronic event organizing system 100 also includes an event database system 160, which includes an event server 170 and event data 180 on one or more storage devices. Event server 170 controls the storage and retrieval of event data 180. For purposes of illustration, server 170 is shown separate from clients 120; but in some embodiments, server 170 resides in part or in whole on one or more of clients 120. Furthermore, for purposes of illustration, one server 170 is connected to one storage device with event data 180, but in other embodiments, the event data may be distributed over several data storage devices connected directly to one or more servers like server 170, or connected indirectly to one or more servers through network 110. Any suitable data system type may be used as event data system 160. In some embodiments, one or more event data servers like server 170 can be embedded in calendar database server 140. In some embodiments, some or all of event data 180 is included on the same storage device or within the same storage records as user calendar data 160.

System 100 also includes an event management server 190. Event management server 190 provides services for organizing the schedule for an event and distributing the schedule to the attendees of the event. Event management server 190 can thereby allow individual users, who may be persons operating one of clients 120, to schedule events among the users maintaining individual electronic calendars on system 100. In exemplary embodiments, the event scheduling services provided by event management system 130 can be accessed using functionality implemented within electronic calendaring applications residing on clients 120. The electronic calendaring applications can comprise, for example, applications provided for a workgroup and server oriented calendaring system, client-based calendaring applications such as Microsoft Outlook, and/or web services-based calendaring applications such as MSN Alerts or Yahoo! Alerts. The functionality for accessing the event scheduling services may be implemented, for example, as an aspect of a software package for the electronic calendaring applications, or as a software module or component implemented for incorporation with the electronic calendaring applications as, for example, one or more libraries of functions, one or more plug-in or extension modules, one or more dynamic link-libraries, etc.

In exemplary embodiments, event management server 190 can be part of calendar database server 140. For purposes of illustration, event management server 190 is depicted as being separate from clients 120 and servers 150, 180; but in some embodiments, event management server 190 can reside in part or in whole on one or more of clients 120 or on a client with other depicted systems 130, 160 or as part of servers 150, 180. In some exemplary embodiments, event management server 190 may be distributed over several clients connected to network 110.

Figure 2:
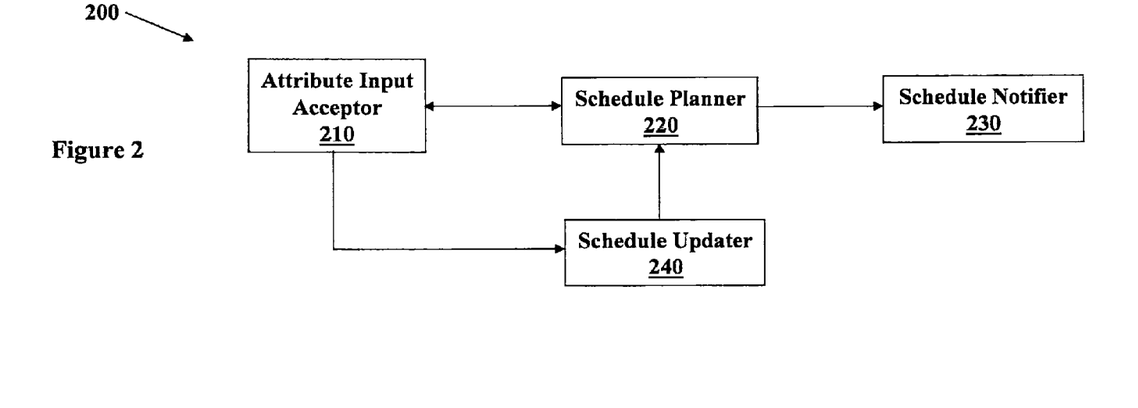
FIG. 2 is a block diagram illustrating an exemplary embodiment of an event management mechanism in accordance with the present invention.

Referring now to FIG. 2, a block diagram of an exemplary embodiment of an event management mechanism 200 in accordance with the present invention is illustrated. Event management mechanism 200 can be implemented, for example, within event management server 190 described above with reference to the exemplary embodiment illustrated in FIG. 1, to allow a user to organize and schedule an event, such as a conference with multiple presentations or an office visit, that involves a number of different participants that will be attending a number of sessions or meetings related to different sub-topics, in which attendance is either optional or mandatory for certain of the participants at certain of the meetings, and in which the multiple meetings can each involve further sub-meetings for which attendance may be either optional or mandatory for the participants of the meeting. In exemplary embodiments in which event management mechanism 200 is implemented within event management server 190 of system 100, the participants of the event can include, for example, users of clients 120 having individual electronic calendars maintained by in user calendar data 150.

In the present exemplary embodiment, event management mechanism 200 includes an attribute input accepting module 210, a schedule planning module 220, a schedule notification module 230, and a schedule update module 240. As used herein, the terms "module" and "program module" both include routines, programs, objects, components, data structures, and instructions, or instructions sets, and so forth that perform particular tasks or implement particular abstract data types. As can be appreciated, the modules can be implemented as software, hardware, firmware and/or other suitable components that provide the described functionality, which may be loaded into memory of a machine embodying exemplary embodiments of a version comparison mechanism in accordance with the present invention. Aspects of the modules may be written in a variety of programming languages, such as C, C++, Java, etc. As used herein, the term "data store" refers to any suitable memory device that may be used for storing data, including manual files, machine-readable files, and databases. The functionality provided by the modules and data stores described with reference to exemplary embodiments presented herein can be combined and/or further partitioned.

Generally, attribute input acceptor 210 is implemented to receive input data providing information needed for scheduling of an event that includes an agenda of meetings for an event, the details of each of the meetings (for example, a location for each meeting), and information regarding the invitees or attendees for the event (for example, the particular meetings each of the invitees will be invited to attend, and whether their attendance for each meeting to which they will be invited is optional or mandatory); schedule planner 220 is implemented to plan a schedule for the event based on the event information received by attribute input acceptor 210 and store the planned event schedule in event schedule 250; schedule notification module 230 is implemented to access event schedule 250 and produce an output that can be rendered for displaying the event schedule planned by schedule planner 220, to generate and send electronic messages to each of the invitees providing the planned schedule for the entire event and a notification of each of the meetings to which the invitee has been invited, as well as to produce an interface accessible by the attendees through, for example, an electronic calendaring application, for notifying attendees of scheduled meetings of which they are to be informed, notifying attendees of scheduled meetings for which their participation is mandatory, notifying the optional attendees of scheduled meetings and providing these attendees with the option of accepting or declining the invitation, notifying the attendees of relevant updates to the event schedule, and updating their respective electronic calendars accordingly; and schedule updater 240 is implemented to accept modifications to the information provided to attribute input acceptor 210 for scheduling the event, which can thereby permit schedule planner 220 to re-plan the schedule for the conference accordingly and schedule notification module 230 to generate new outputs corresponding to the re-planned schedule.

With more particularity, attribute input acceptor 210 is implemented to allow the event chair to define an event that comprises multiple sub-meetings by specifying values for a set of attributes for the event and for each sub-meeting, and then submit the event as defined in this fashion to event management mechanism 200 for scheduling in accordance with the specified set of parameters. Each of the values for the attributes of each meeting object instance for the event can either be submitted by the event chair through a user interface implemented within event management mechanism 200 or imported from information recorded in an external data store such as, for example, data from individual electronic calendars maintained for invitees to the event and/or flat files of data containing event overview data and a list of attendees. The event chair can also specify, for each value, from where the information for that value is to be obtained.

In exemplary embodiments in which event management mechanism 200 is implemented within event management server 190 of system 100, event management mechanism 200 can be configured to maintain the data for the event as defined through input values received by attribute input acceptor 210 in event data 180 of event database system 160, and the various modules included within the event management mechanism can be configured to store, retrieve, and operate on data for the event by accessing the event data through event 170. Furthermore, in these embodiments, the event management mechanism can be configured to provide an interface mechanism that can be utilized the chair user for inputting parameters for an event and sub-meetings for the event to be scheduled and directing the event management mechanism to plan a schedule for the event accordingly. This interface mechanism can be, for example, incorporated within and provided through a user interface implemented by electronic calendaring applications being operated by users of clients 120. For example, the interface mechanism can be accessible for defining an event when a user selects an "Add Event" button provided through the user interface of the calendaring application, and while being accessed for event, the interface mechanism can be further accessible for defining a sub-meeting by selecting an "Add Sub-meeting" button. In exemplary embodiments, the interface mechanism can be further implemented to provide interface elements that can be accessed to allow a user to modify, delete, view, or otherwise operate upon the defined event and sub-meetings, as well as the attribute values submitted therefore.

For each event and for each sub-meeting, attribute input acceptor 210 instantiates an instance of a meeting object that includes an attribute field for holding a value for each attribute that can be specified for a meeting. In particular, in the present exemplary embodiment, each meeting object instance includes attribute fields for maintaining values for a meeting ID, a meeting type, a meeting chair (the chair for an event is the event chair that defines the event and the sub-meetings to be scheduled for the event), a meeting location, a list of invitees, a meeting start time and date, and a meeting duration. The value for the meeting type attribute field can be specified as an event, a group, or a session. A meeting object instance having an event meeting type value is also defined with a specified meeting duration within which all sub-meetings for the event are to be scheduled. A meeting object instance having a group meeting type value corresponds to a subset of the set of all sub-meetings for the event and is defined with a specified meeting duration within which all of the sub-meetings in the subset of sub-meetings defined for the group are to be scheduled. A meeting object instance having a session meeting type value corresponds to a particular sub-meeting of the event to be scheduled by event management mechanism 200. Meeting object instances having event or group meeting type values do not correspond to sessions to be scheduled by event management mechanism 200. Rather, each meeting object instance having an event or a group meeting type value includes attribute values specified to provide parameters for scheduling the sub-meetings that have meeting object instances encompassed by that event or a group meeting object instance.

Thus, it can be seen that, in the present exemplary embodiment, the meeting object instances can be represented using a hierarchical structure in which sub-meetings that are defined by meeting object instances encompassed by an event or a group meeting object instance have a parent-child relationship with the encompassing event or a group meeting object instance. Sub-meetings that are defined by meeting object instances encompassed by an event or a group meeting object instance can inherit attribute values from the encompassing event or a group meeting object instance. The meeting chair for each sub-meeting that is defined a meeting object instance encompassed by an event or a group meeting object instance can be defined by the specified meeting chair for the encompassing event or a group meeting object instance.

Each meeting object instance for a sub-meeting having a parent-child relationship with an event meeting object instance, as specified by the event chair for the event, can be referred to as a "first-level sub-meeting", and once defined by the event chair, the meeting chair for each first-level sub-meeting can define further define meeting object instances for sub-meetings having a parent-child relationship with the first-level sub-meeting, referred to as "second-level sub-meetings", and assign a meeting chair for each second-level sub-meeting. The meeting chair for each second-level sub-meeting can further define "third-level sub-meetings" (in which the second-level sub-meeting and each third-level sub-meeting have a parent-child relationship) and assign a meeting chair thereto, and so on. For example, a first chair can provide parameters for a parent meeting object instance having an event meeting type and a child meeting object instance having a group meeting type. If the first chair assigns a second chair for the meeting object instance having a group meeting type, the second chair can then provide parameters defining one or more meeting object instances for sub-meetings encompassed by the parent meeting object instance having a group meeting type.

Meeting object instances having non-event meeting types (that is, session or group meeting types, which correspond to sub-meetings) can be further defined to store values for additional attributes that include a speaker or presenter name, a list of invitees for whom attendance is mandatory, a list of invitees for whom attendance is optional, a list of persons to be informed about the meeting, a reference to a parent meeting object instance (indicating the event or group meeting object instance for the meeting object instance having the reference attribute), a Boolean value indicating whether the start time for the sub-meeting is fixed or variable, and a set of references to predecessor meeting object instances indicating which, if any, of the other sub-meetings must be scheduled to take place prior to the sub-meeting corresponding to that meeting object instance. A meeting object instance having a group meeting type may or may not include a specified value for the speaker.

As mentioned above, a child meeting object instance for a sub-meeting can inherit attribute values from its parent meeting object instance. The specific attributes that are inherited by a child meeting object instance can be specified by the meeting chair for the parent meeting object instance. Child meeting object instances for sub-meetings having a variable start time can be indicated as such by specifying that the meeting start time attribute is to be inherited from the parent meeting object instance. The meeting chair for a parent meeting object instance can also specify whether each attribute for each child meeting object instance is modifiable or locked. An attribute of a meeting object instance that is defined as being modifiable can then be modified by the meeting chair assigned for that meeting object instance.

Figure 3A:
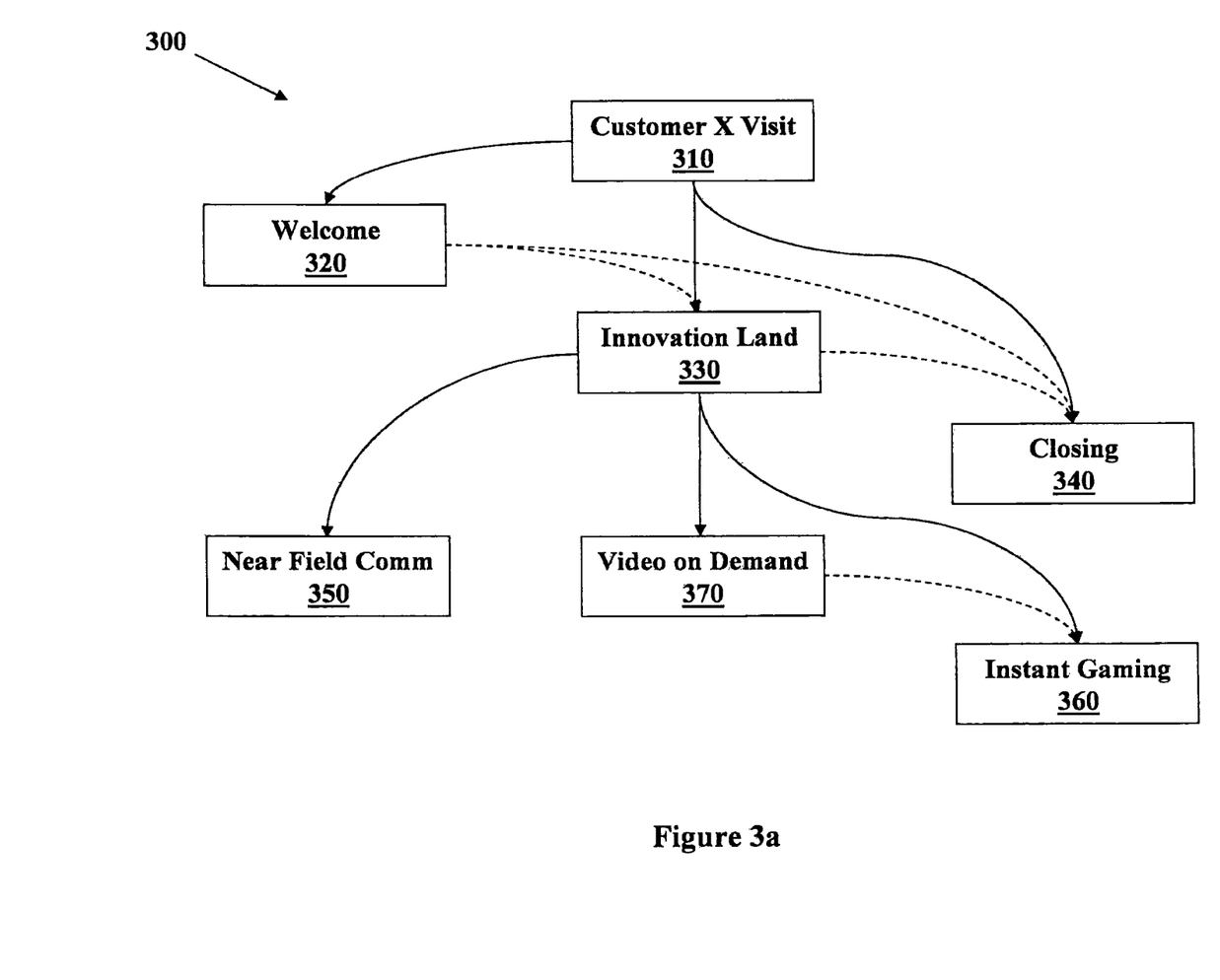
FIGS. 3a and 3b respectively illustrate hierarchical tree and table representations of an example set of event data.

Referring now to FIG. 3a, an example set of meeting object instances 300 (which can be instantiated, for example, by attribute input acceptor 210 of the exemplary embodiment illustrated in FIG. 2) for an event and a set of sub-meetings for the event is illustrated in a hierarchical tree representation. The event is an organized visit to a corporate office by Customer X. Meeting object instances 300 include an instance for the event Customer X Visit 310 defined according parameters provided by event chair Carol. As indicated by the parent reference attributes of meeting object instances 300, Customer X Visit 310 is a parent meeting object instance for the child meeting object instances for sub-meetings Welcome 320, Innovation Land 330, and Closing 340. Sub-meetings Welcome 320 and Closing 340 are sub-meetings provided with meeting object instances having a session meeting type. Innovation Land 330 is a sub-meeting provided with a meeting object instance having a group meeting type and Veran as an assigned chair. As indicated by the parent reference attributes of meeting object instances 300, Innovation Land 330 is a parent meeting object instance for the child meeting object instances for sub-meetings Near Field Communication 350, Instant Gaming 360, and Video on Demand 370. As indicated by the predecessor reference attributes of meeting object instances 300, Welcome 320 should be scheduled to precede Innovation Land 330, Welcome 340 should be scheduled to precede the sub-meetings of the group encompassed by Innovation Land 330 group, Video on Demand 370 should be scheduled to precede Instant Gaming 360, and all other sub-meetings of the event encompassed by Customer X Visit 310 should be scheduled to precede Closing 340. In FIG. 3a, arrows having solid lines indicate the parent-child relationships between the meeting object instances, and arrows having dashed lines indicate the predecessor relationships between the meeting object instances.

Figure 3B:
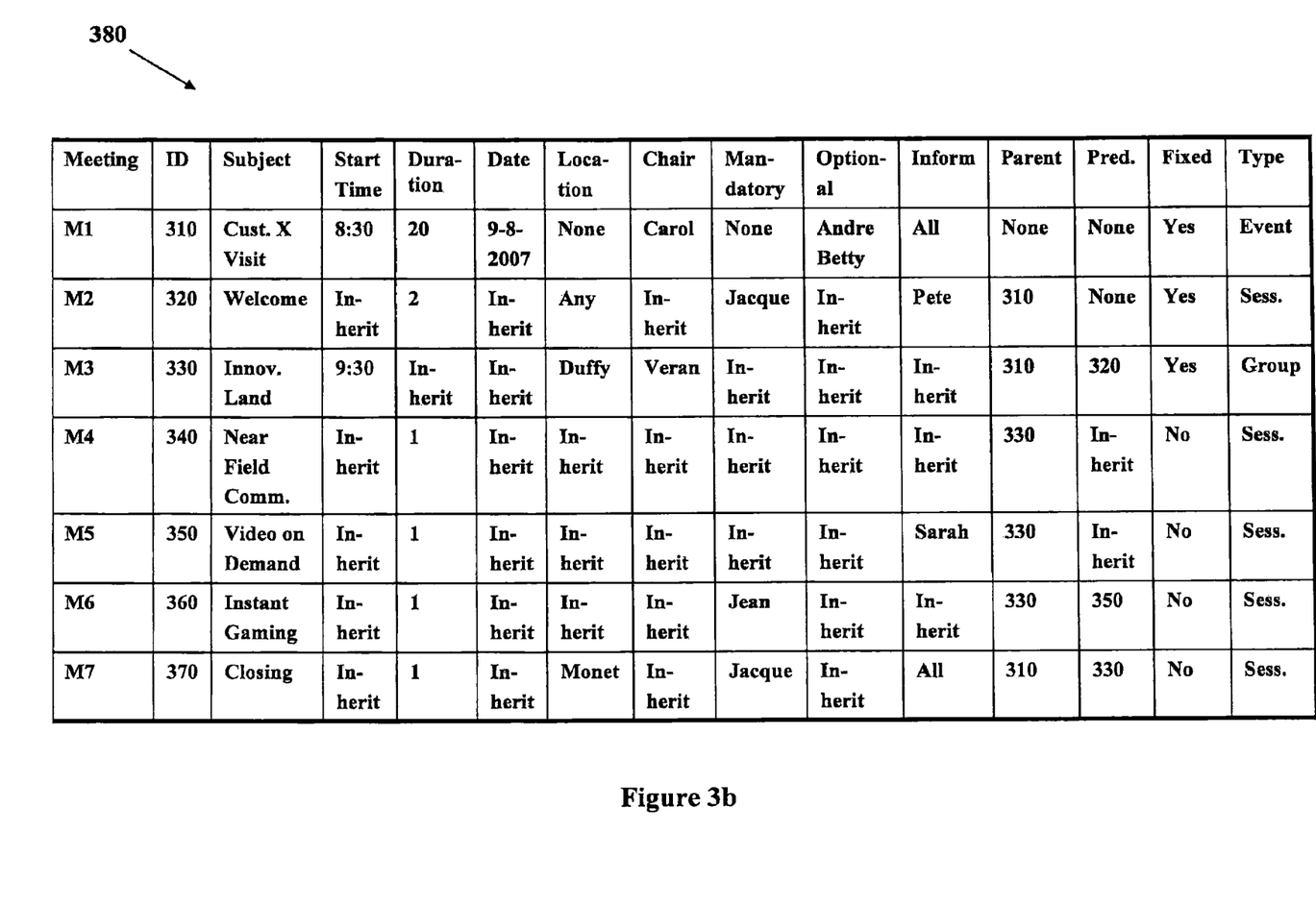

Referring again to the exemplary embodiment illustrated in FIG. 2, attribute input acceptor 210 can be implemented to organize the meeting object instances defined for an event and their respective attributes, and to provide the organized meeting object instances in a table format. For example, attribute input acceptor 210 can be configured to organize the parameters provided for the example event Customer X Visit 310 into a table 380, as depicted in FIG. 3b. Table 380 represents the parameters provided for Customer X Visit 310 and each of meeting object instances 300 of the sub-meetings encompassed thereby. For example, because Customer X Visit 310 has an event meeting type, table 380 does not include defined parameters for mandatory invitees, parent reference, predecessor reference, and a fixed time for Customer X Visit 310. Also, as represented in table 300, the sub-meetings defined in Welcome 320, Near Field Communication 350, and Video on Demand 370 are specified as having a fixed start time.

Figure 4A:
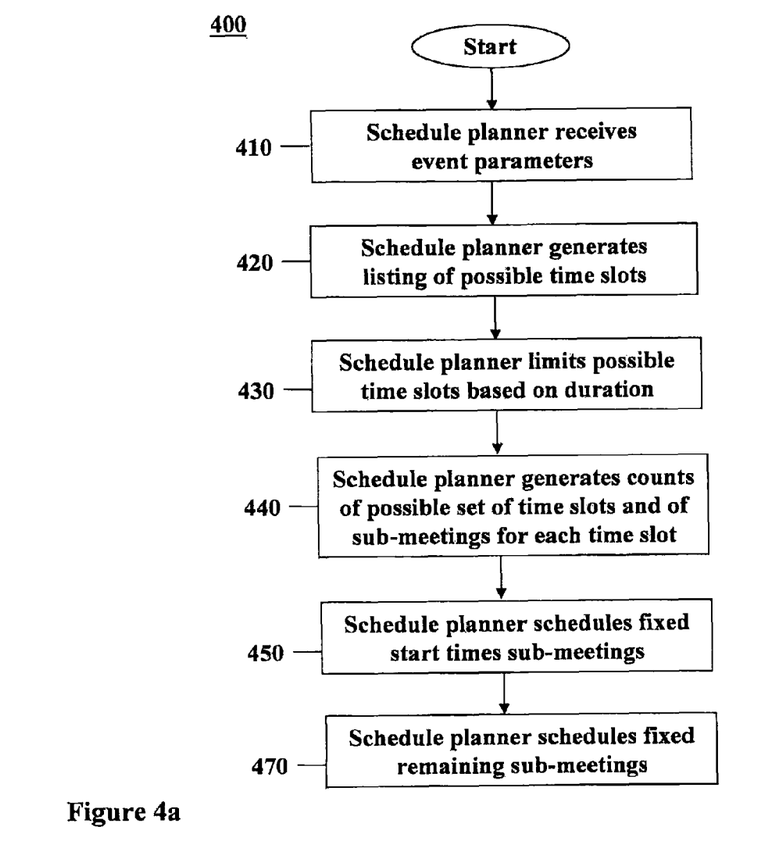
FIGS. 4a and 4b are flow diagrams illustrating an exemplary embodiment of an event scheduling process in accordance with the present invention.

Schedule planner 220 is implemented to plan a schedule for the event based on the event information accepted and organized by attribute input acceptor 210, as described, and to submit the planned schedule for the event to schedule notifier 140. In exemplary embodiments, the schedule planner can be implemented to plan the schedule for the event according to an event scheduling process 400 provided by the flow charts illustrated in FIGS. 4a and 4b. Referring initially to FIG. 4a, in exemplary process 400, at block 410, schedule planner 220 receives the event parameters provided to and organized by attribute input acceptor 210 for the meeting object instances defining the event and its sub-meetings.

At block 420, schedule planner 220 generates a listing of all possible time slots within which each sub-meeting corresponding to a meeting object instance having a session meeting type may be scheduled. The listing can, for instance, be provided in a table format, as depicted by table 390a in FIG. 3c for an example event. Table 390a lists the sub-meetings to be scheduled for the example event by the meeting ID attribute value of their respective meeting object instances in a header column and the available time slots sequentially in a header row. The time length of each time slot in the listing generated at block 420 can correspond to the least common denominator of the time length values for all the duration attributes provided for the meeting object instances of the event. As a result, the duration attribute values for each meeting object instance can be represented by an integer value that corresponds to the number of time slots encompassed by the time length of the duration attribute value for the meeting object instance. The possible time slots listed for each sub-meeting in the listing generated at block 420 are determined according to relationships between the meeting object instance attribute values for location and mandatory invitees. These attributes are used to limit the possible time slots by listing only as possible those time slots that do not involve an unresolvable conflict, as two sub-meetings cannot be scheduled for the same time at the same location, and a mandatory invitee for a sub-meeting cannot attend a sub-meeting as required if the invitee is unavailable during the scheduled time slot for the sub-meeting or required to attend another sub-meeting as a mandatory invitee at the same scheduled time slot. As will be described, schedule planner 220 uses the listing of possible time slots generated at block 420 to plan an optimized schedule for the event.

At block 430, schedule planner 220 modifies the listing generated at block 420 to limit the possible time slots within which each sub-meeting corresponding to a session or group meeting object instance may be scheduled according to the duration attributes in the parameters provided to attribute input acceptor 210. Because some meeting object instances can be defined with a duration that extends over multiple time slots, schedule planner 220 can be implemented to, at block 430, suppress the possible time slots in the listing generated at block 420 for such meeting object instances to only those included within sets of multiple, contiguous time slots that together are sufficient to cover the entire time length of the duration specified for the time slots (that is, sets of multiple, contiguous time slots having an aggregate time length that is greater than or equal to the duration value of the meeting object instance). It is not necessary for schedule planner 220 to suppress the possible time slots for meeting object instances that have a specified meeting start time value and a duration that corresponds to multiple time slots, as the listing generated at block 420 will have only yielded one possible set of contiguous time slots listed for the sub-meeting. At block 440, schedule planner processes the listing to generate a count of possible sets of time slots for each sub-meeting and a count of the possible sub-meetings for which each time slot can be allocated.

Figure 3C:
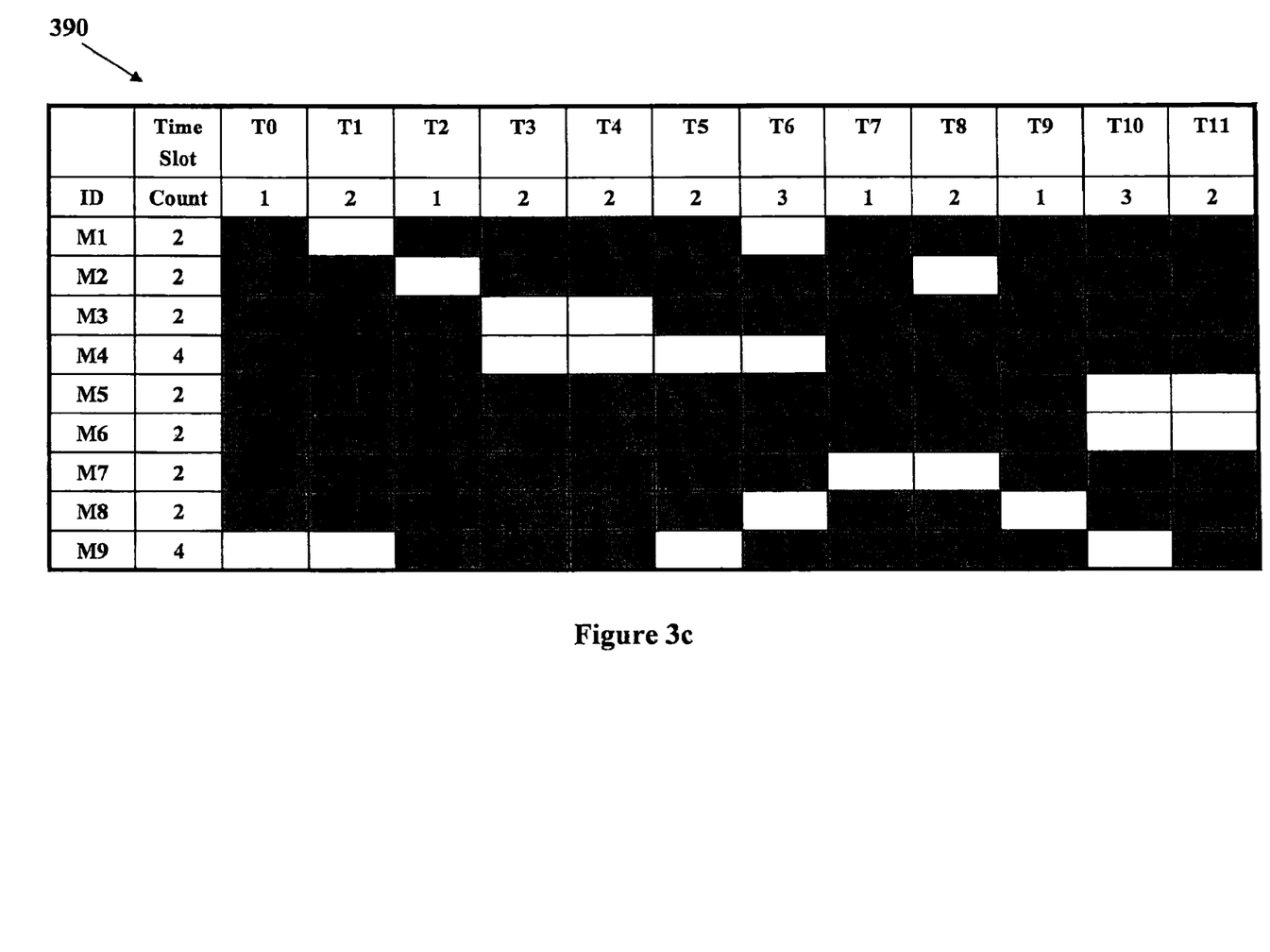
FIGS. 3c and 3d illustrate example table representations for possible scheduling data that may be generated by exemplary embodiments of the present invention.
Figure 3D:
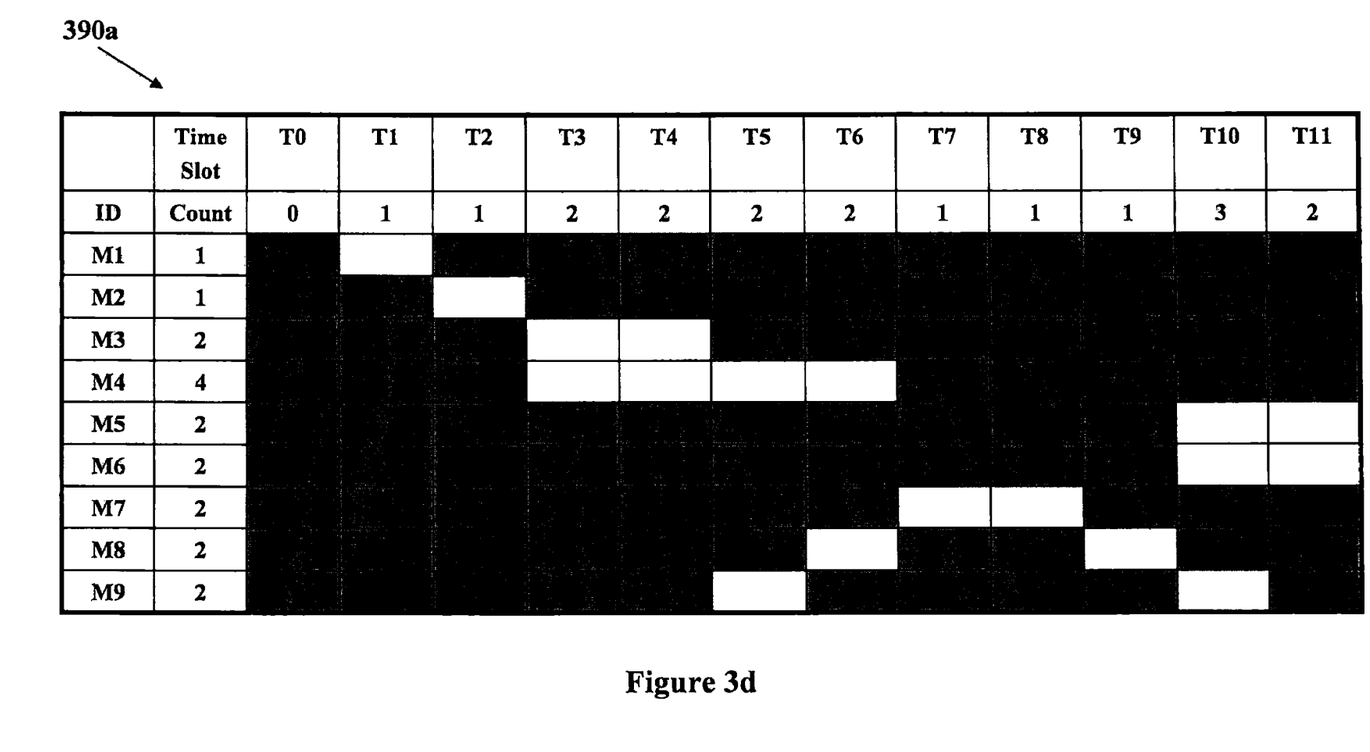

The modified listing resulting from the operations performed at block 430 can, for example, be generated in table format, as depicted by table 390*b* in FIG. 3*d* for the example event represented by table 390*a* in FIG. 3*c*. Table 390*b* lists the sub-meetings to be scheduled for the example visit by their meeting ID attribute value in a header column and the available time slots sequentially in a header row. As shown in the information provided by table 390*b*, the table format for the listing generated at block 430 can also include the count of possible sets of time slots for scheduling each the sub-meeting and the count of the possible sub-meetings for which each time slot can be allocated as generated at block 440.

Figure 4B:
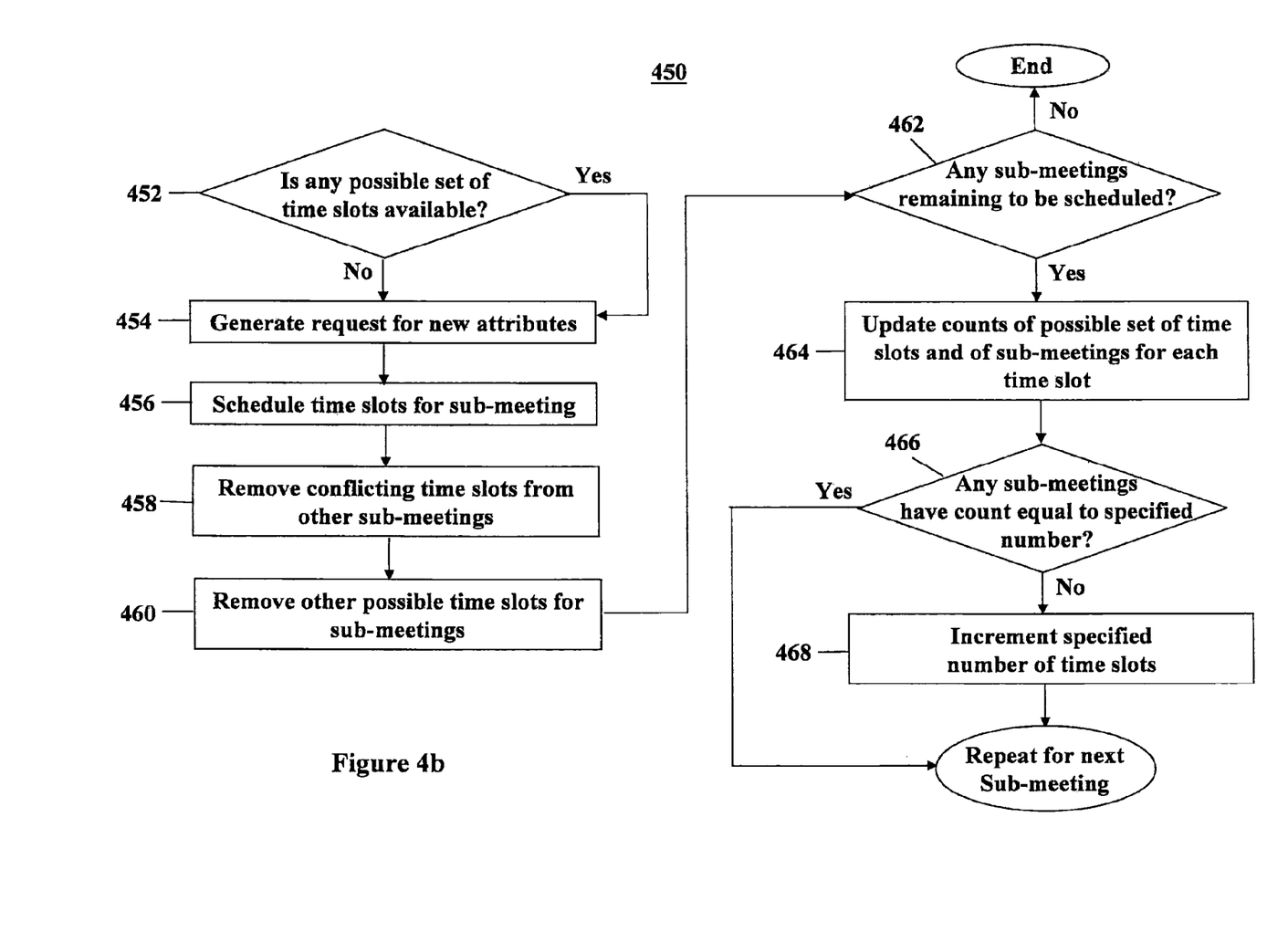

In the present exemplary embodiment, at block 450, for each session type meeting object instance having a start time attribute value that is specified as being fixed, schedule planner 220 performs the session scheduling process provided in blocks 452-468 of FIG. 4*b* and described in detail below for scheduling the sub-meeting and then updating the listing of all possible time slots within which each sub-meeting having a session type meeting object instance may be scheduled according to relationships between the attributes of the meeting object instances for start times, durations, and references to predecessor meetings. After scheduling each session type meeting object instance having a start time attribute value that is specified as being fixed, at block 470, schedule planner 220 resolves the remaining meeting schedule by performing the session scheduling process provided in blocks 452-468 in the order from sub-meetings having the lowest count of possible sets of time slots within which the sub-meeting can be scheduled to sub-meetings having the highest count of possible sets of time slot(s) within which the sub-meeting can be scheduled.

More specifically, schedule planner 220 first performs the session scheduling process provided in blocks 452-468 for each sub-meeting having only one possible set of time slots covering the duration value of the meeting object instance corresponding to the sub-meeting in the listing of all possible time slots within which each sub-meeting may be scheduled. As will be described, after allocating a set of time slots for a particular sub-meeting during the session scheduling process, schedule planner 220 updates the count of possible sets of time slots for each unscheduled sub-meeting and the count of the possible sub-meetings for which each time slot can be allocated. Dynamically updating the counts after scheduling each sub-meeting enables schedule planner 220 to perform the session scheduling process provided in blocks 452-468 for each sub-meeting having only one possible set of time slots until there are no sub-meetings having only one possible set of time slots remaining. If there are any remaining sub-meetings to be scheduled after no sub-meetings having only one possible set of time slots remain to be scheduled, schedule planner 220 then performs the session scheduling process provided in blocks 452-468 for each sub-meeting having only two possible set of time slots until there are no sub-meetings having only two possible sets of time slots remaining to be scheduled. Schedule planner 220 will continue in fashion by sequentially incrementing the specified number of possible sets of time slots and performing the session scheduling process provided in blocks 452-468 for each sub-meeting having the specified number of possible set of time slots until there are no sub-meetings remaining to be scheduled. Where there are multiple sub-meetings having the specified number of possible set of time slots, the order in which these sub-meetings are scheduled by schedule planner 120 can be determined according to, for example, the order of sub-meetings having the earliest occurring possible sets of time slots, according to priority values submitted for the sub-meetings (the priority values can, for example, be submitted to schedule planner 220), or predecessor values. At this point, schedule planner 220 will have generated a schedule for the entire event.

The session scheduling process performed by schedule planner 220 in the present exemplary embodiment, as provided in blocks 452-468, will now be described in greater detail. The process illustrated in blocks 452-468 is performed for each sub-meeting to be scheduled in the order described above. For the present sub-meeting being scheduled, at decision block 452, schedule planner 220 determines whether any of the possible sets of time slots within which the sub-meeting may be scheduled is available. For instance, if there is only one possible set of time slots within which the sub-meeting may be scheduled listed (for example, for a sub-meeting corresponding to a meeting object instance having a fixed start time), schedule planner 220 determines if the time slot(s) corresponding to the start time for the possible set of time slots for the sub-meeting and the duration specified for the sub-meeting is or are available. That is, schedule planner 220 determines whether any of the possible set of time slots have been allocated for another sub-meeting having a session type meeting object instance that has already been scheduled, whether there are any predecessor relationships specified in the meeting object instances that would prevent the sub-meeting from being scheduled in the possible set of time slots, or whether, if the sub-meeting being scheduled corresponds to a meeting object instance for which a fixed start time has been specified, any of the time slots corresponding to the fixed start time and the duration attribute values of the meeting object instance were not included in the listing of possible time slots generated at block 420 as a result of conflicts arising due to the relationships between the meeting object instance attribute values for location and mandatory invitees. On the other hand, if there is more than one possible set of time slots within which the sub-meeting may be scheduled listed, schedule planner 220 determines, for each possible set of time slots sequentially (for instance, in order from earliest to latest), if the time slot(s) corresponding to the start time for the possible set of time slots for the sub-meeting and the duration specified for the sub-meeting is or are available as described above until one of the possible sets of time slots is determined to be available or each of the possible sets of time slots is determined to not be available.

If schedule planner 220 determines, at decision block 452, that, for each of the each of the possible sets of time slots for the sub-meeting, there is at least one time slot in the set that is not available (for any of the reasons specified above), the process proceeds to block 454, at which the schedule planner generates a request for the event chair (or for the meeting chair for a group message object instance that encompasses the sub-meeting) to submit new attribute values for the message object instance corresponding to the sub-meeting through attribute input acceptor 210 that will allow the sub-meeting to be scheduled in an available time slot. In exemplary embodiments in which event management mechanism 200 is implemented within event management server 190 of system 100 (as described with reference to FIG. 1 above), this request can be provided to the event chair through, for example, the user interface implemented within the electronic calendaring application operating on one of clients 120.

After either schedule planner 220 has determined at decision block 452 that there is a possible set of time slots for the sub-meeting that is available or new attribute values for the message object instance corresponding to the sub-meeting have been submitted at block 454, at block 456, schedule planner 220 schedules the sub-meeting by allocating the set of time slots corresponding to either the possible set of time slots identified as being available at decision block 452 or the set of time slots corresponding to the new attribute values submitted for the message object instance corresponding to the sub-meeting at block 454 in event schedule 250. Then, at block 458, schedule planner 220 removes any time slots from the listing of possible time slots within which each of the other sub-meetings may be scheduled that correspond to any time slots allocated for the scheduled sub-meeting at block 456 or that would conflict with any predecessor relationships specified in the meeting object instances. At block 460, schedule planner 220 removes any other time slots not allocated for the scheduled sub-meeting from the listing of possible time slots for which the scheduled sub-meeting could have been scheduled.

As described above, schedule planner 220 is implemented to repeat the session scheduling process encompassed by block 450 for each session type meeting object instance corresponding to a sub-meeting until there are no sub-meetings remaining to be scheduled. To provide for this, at decision block 462, schedule planner 220 determines whether there are any sub-meetings remaining to be scheduled. If there are no sub-meetings remaining to be scheduled, the event schedule is complete, and exemplary process 400 terminates. If there are sub-meetings remaining to be scheduled, at decision block 464, schedule planner 220 updates, for each sub-meeting remaining to be scheduled, the count of possible sets of time slot(s) for scheduling the sub-meeting and the count of the possible sub-meetings for which each time slot can be allocated. Then, at decision block 466, schedule planner 220 determines if any of the sub-meetings remaining to be scheduled have a count of possible time slots that is equal to specified number of possible sets of time slots. If any of the sub-meetings have a count of possible time slots that is equal to specified number of possible sets of time slots, schedule planner 220 repeats the session scheduling process for the next sub-meeting to be scheduled. If none of the sub-meetings have a count of possible time slots that is equal to specified number of possible sets of time slots, schedule planner 220, at block 468, increments the specified number of possible sets of time slots until at least one of the sub-meetings remaining to be scheduled has a count of possible time slots that is equal to specified number of possible sets of time slots. Schedule planner 220 then repeats the session scheduling process for the next sub-meeting to be scheduled.

Referring again to FIG. 2, once schedule planner 220 has allocated time slots for all of the sub-meetings of an event being scheduled in event schedule 250, schedule notification module 230 is configured to access event schedule 250 to produce an output display that can be rendered for viewing the schedule planned by schedule planner 220, and to generate and send event schedule messages to each of the attendees containing the planned schedule information for each of the sub-meetings to which the attendee has been invited. The event schedule messages can be generated individually for each of the attendees. The message generated for each attendee can include the output display allowing the attendee to view the entire event schedule, as well as a notification of each sub-meeting for which the attendee's participation is mandatory or optional, as well as a notification of each sub-meeting for which the attendee is included in the list of persons who should be informed about the meeting in the meeting object instance indicates that corresponding to the sub-meeting.

In exemplary embodiments in which event management mechanism 200 is implemented within event management server 190 of system 100, the event schedule messages for each attendee generated by schedule notification module 230 can be further implemented to, upon being received by a messaging application incorporated within the attendee's electronic calendaring application being operated on one of clients 120, direct the electronic calendaring application to place each of the sub-meetings for which the attendee's participation is specified as mandatory on the attendee's electronic calendar according to the date, time, and duration attribute values specified for the sub-meeting, as well as to provide an option for the attendee to accept or decline each invitation to a sub-meeting for the attendee's participation is specified as optional. The event schedule message can also be implemented to provide an option for the attendee to accept or decline participation in each sub-meeting for which the attendee has been specified as a person who should be informed of the sub-meeting. This option can provided, for example, through a user interface element provided through the user interface implemented within the attendee's electronic calendaring application. When an attendee selects the option to accept participation in a sub-meeting, the attendee's electronic calendaring application can be directed to place the sub-meetings on the attendee's electronic calendar according to the date, time, and duration attribute values specified for the sub-meeting. Additionally, when an attendee selects the option to accept or the option to decline participation in a sub-meeting, the attendee's electronic calendaring application can be directed to send a reply message to the chair for the sub-meeting notifying the chair of such.

In the present exemplary embodiment, as discussed above, schedule updater 240 is implemented to accept modifications to the attributes of the meeting object instances corresponding to the event and the sub-meetings for the event as provided to attribute input acceptor 210, and direct schedule planner 220 to re-plan the schedule for the conference accordingly in event schedule 250. In exemplary embodiments in which event management mechanism 200 is implemented within event management server 190 of system 100, the functionality for modifying an event or a sub-meeting in the manner can be provided via an interface element incorporated within the user interface implemented by electronic calendaring applications being operated by the respective chair for the event or sub-meeting on one of clients 120. Schedule planner 220 can be implemented to plan the subsequent schedule based on the modified set of meeting object instances in a similar manner as described above, and schedule notification module 230 can be implemented to access event schedule 250 to generate new outputs corresponding to the re-planned schedule. The new outputs can include a revised output display that can be rendered for viewing the schedule planned by schedule planner 220, and to generate and send event schedule messages for each sub-meeting that has been rescheduled in the subsequent schedule to each of the attendees specified as having mandatory or optional participation in the rescheduled sub-meeting, each of the attendees specified as having mandatory participation for the sub-meeting in the previous schedule, each of the attendees who had selected the option to accept participation for the sub-meeting in the previous schedule, and each attendee that is specified as a person who should informed of the sub-meeting. The event schedule messages can also be implemented to direct the affected attendees' electronic calendaring applications to update the attendees' electronic calendars accordingly.

In the preceding description, for purposes of explanation, numerous specific details are set forth in order to provide a thorough understanding of the described exemplary embodiments. Nevertheless, one skilled in the art will appreciate that many other embodiments may be practiced without these specific details and structural, logical, and electrical changes may be made.

Some portions of the exemplary embodiments described above are presented in terms of algorithms and symbolic representations of operations on data bits within a processor-based system. The operations are those requiring physical manipulations of physical quantities. These quantities may take the form of electrical, magnetic, optical, or other physical signals capable of being stored, transferred, combined, compared, and otherwise manipulated, and are referred to, principally for reasons of common usage, as bits, values, elements, symbols, characters, terms, numbers, or the like. Nevertheless, it should be noted that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

Exemplary embodiments of the present invention can be realized in hardware, software, or a combination of hardware and software. Exemplary embodiments can be implemented using one or more program modules and data storage units. Exemplary embodiments can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

Exemplary embodiments of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following: (a) conversion to another language, code or, notation; and (b) reproduction in a different material form.

A computer system in which exemplary embodiments can be implemented may include, inter alia, one or more computers and at least a computer program product on a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface including a wired network or a wireless network that allow a computer system to read such computer readable information.

Figure 5:
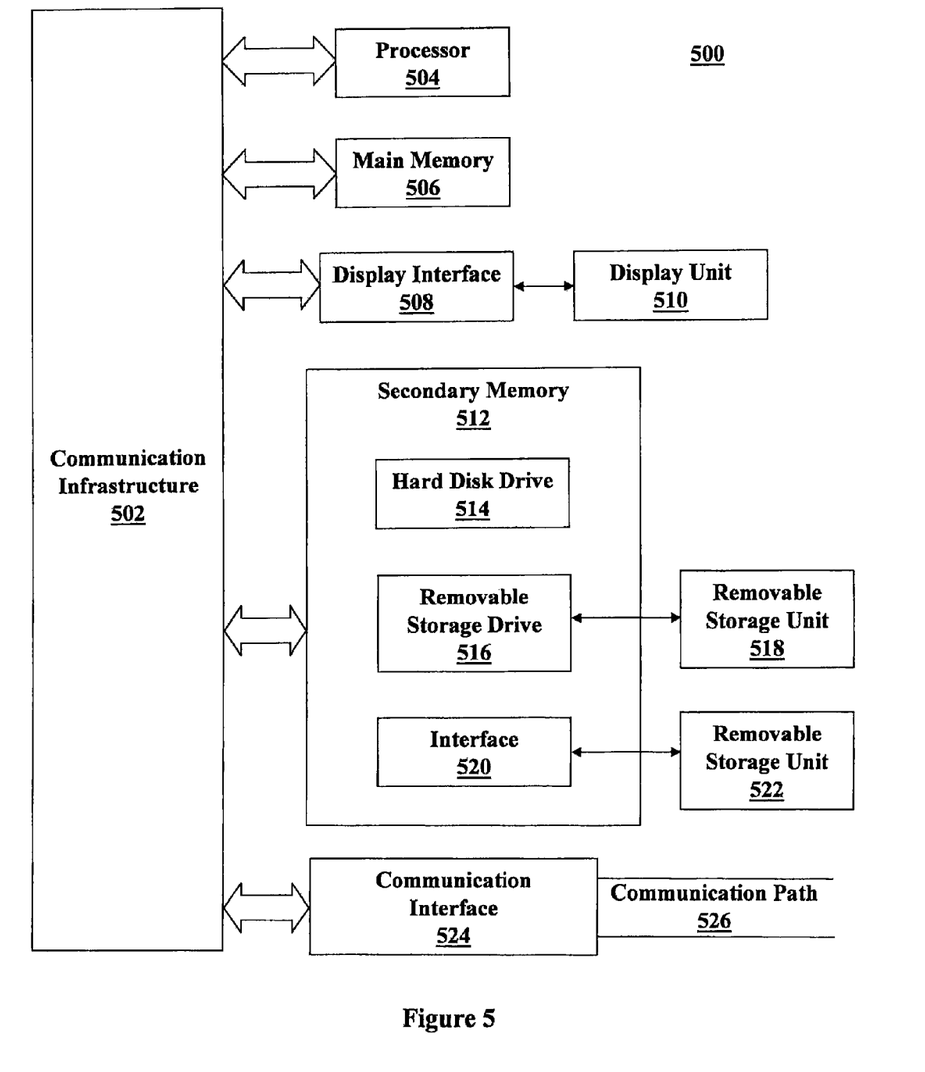
FIG. 5 is a block diagram illustrating an exemplary computer system within which exemplary embodiments of the present invention can be implemented.

FIG. 5 is a block diagram of an exemplary computer system 500 that can be used for implementing exemplary embodiments of the present invention. Computer system 500 includes one or more processors, such as processor 504. Processor 504 is connected to a communication infrastructure 502 (for example, a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

Exemplary computer system 500 can include a display interface 508 that forwards graphics, text, and other data from the communication infrastructure 502 (or from a frame buffer not shown) for display on a display unit 510. Computer system 500 also includes a main memory 506, which can be random access memory (RAM), and may also include a secondary memory 512. Secondary memory 512 may include, for example, a hard disk drive 514 and/or a removable storage drive 516, representing a floppy disk drive, a magnetic tape drive, an optical disk drive, etc. Removable storage drive 516 reads from and/or writes to a removable storage unit 518 in a manner well known to those having ordinary skill in the art. Removable storage unit 518, represents, for example, a floppy disk, magnetic tape, optical disk, etc. which is read by and written to by removable storage drive 516. As will be appreciated, removable storage unit 518 includes a computer usable storage medium having stored therein computer software and/or data.

In exemplary embodiments, secondary memory 512 may include other similar means for allowing computer programs or other instructions to be loaded into the computer system. Such means may include, for example, a removable storage unit 522 and an interface 520. Examples of such may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between the computer system and external devices. Examples of communications interface 524 may include a modem, a network interface (such as an Ethernet card), a communications port, a PCMCIA slot and card, etc. Software and data transferred via communications interface 524 are in the form of signals which may be, for example, electronic, electromagnetic, optical, or other signals capable of being received by communications interface 524. These signals are provided to communications interface 524 via a communications path (that is, channel) 526. Channel 526 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 506 and secondary memory 512, removable storage drive 516, a hard disk installed in hard disk drive 514, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface including a wired network or a wireless network that allow a computer to read such computer readable information.

Computer programs (also called computer control logic) are stored in main memory 506 and/or secondary memory 512. Computer programs may also be received via communications interface 524. Such computer programs, when executed, can enable the computer system to perform the features of exemplary embodiments of the present invention as discussed herein. In particular, the computer programs, when executed, enable processor 504 to perform the features of computer system 500. Accordingly, such computer programs represent controllers of the computer system.

Although exemplary embodiments of the present invention have been described in detail, the present description is not intended to be exhaustive or limiting of the invention to the described embodiments. It should be understood that various changes, substitutions and alterations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

The exemplary embodiments presented herein were chosen and described to best explain the principles of the present invention and the practical application, and to enable others of ordinary skill in the art to understand the invention. It will be understood that those skilled in the art, both now and in the future, may make various modifications to the exemplary embodiments described herein without departing from the spirit and the scope of the present invention as set forth in the following claims. These following claims should be construed to maintain the proper protection for the present invention.

What is claimed is:

1. A method of scheduling events having multiple meetings and multiple attendees, the method comprising:

receiving, by a computer system, a set of event data including a plurality of sessions each comprising a plurality of sub-meetings, an event duration that encompasses a plurality of time slots, a respective duration for each sub-meeting, a respective start time for the event and each of the plurality of sub-meetings, and a set of information describing a plurality of event attendees that includes a respective list of one or more mandatory attendees for each sub-meeting, wherein the set of sub-meetings further includes one or more group sessions for the event, wherein set of event data specifies a hierarchical relationship for the event and the set of sub-meetings with the event at a highest level of the hierarchical relationship, wherein each sub-meeting has a parent selected from the event and the sub-meetings of the set of sub-meetings in the hierarchical relationship, wherein each sub-meeting can inherit event data from the set of event data specified for the parent of the sub-meeting, wherein each group session is the parent of at least one of the one or more sessions for the event, and wherein generating the second list further includes removing each possible set of time slots from the first list for each session having one of the one or more group sessions as the parent of the session that is not within the respective duration specified for the group session;

generating, by the computer system, a first list of each possible set of time slots from the plurality of time slots for each session within which the session can be scheduled based upon the specified lists of one or more mandatory attendees and the respective start times for the sub-meetings;

generating, by the computer system, a second list by removing each possible set of time slots from the first list for each session that is less than the duration specified for the session;

individually performing a scheduling process for each session that comprises allocating a respective set of time slots for the session in an event schedule, removing each possible set of time slots for the session that is not equivalent to the set of time slots allocated for the session from the second list, and removing each possible set of time slots for each other session that includes at least one time slot allocated for the session in the event schedule from the second list; and sending, by the computer system, a respective electronic message presenting the event schedule to each event attendee of the plurality of event attendees.

2. The method of claim 1, wherein the set of event data further specifies an indication of whether the respective start time specified for each of the plurality of sub-meetings is fixed and a respective predecessor reference for each of the plurality of sub-meetings to a respective predecessor sub-meeting of the set of sub-meetings that must be scheduled to take place before the sub-meeting, wherein generating the first list is further based upon the respective indication of whether the respective start time specified for each of the plurality of sub-meetings is fixed such that the first list will include exactly one possible set of time slots for each session for which the respective start time is specified as being fixed, and wherein generating the second list further includes removing each possible set of time slots from the first list for each session specified with a predecessor reference that cannot be scheduled after each possible set of time slots for the respective predecessor sub-meeting.

3. The method of claim 2, wherein the scheduling process is first performed individually for each session specified with respective start time that is specified as being fixed, wherein the scheduling process is then performed individually for each session in order from sessions having the fewest number of remaining possible sets of time slots in the second list to sessions having the highest number, and wherein the scheduling process further comprises generating a request for the respective set of time slots to be allocated for the session if the session has zero remaining possible sets of time slots in the second list, receiving the respective set of time slots to be allocated for the session if there are no remaining possible sets of time slots for the session in the second list, and selecting one of the remaining possible sets of time slots for the session in the second list as the respective set of time slots to be allocated for the session if there is at least one remaining possible set of time slots for the session in the second list.

4. The method of claim 2, wherein individually performing a scheduling process for each session is performed within an event organizing system that includes a network connecting a plurality of client computers, a calendar database system maintaining a respective set of calendar data for each attendee of the plurality of attendees for the event, an event database system, and an event management server, wherein each of the plurality of client computers is configured with a calendaring application operable by each attendee to access and operate on the respective set of calendar data for the attendee, and wherein the event management server is configured to receive the set of event data for the event, store the set of event data in the event database system, and operate on the set of event data to generate the first list, generate the second, and individually schedule each session in the event schedule.

5. The method of claim 4, wherein the set of information describing a plurality of event attendees further includes a respective list of one or more optional attendees for each sub-meeting, wherein the respective electronic message sent to each event attendee in the respective list of mandatory attendees for each session is configured to direct the calendaring application to access the calendar database system to schedule the allocated set of time slots for the session in the respective set calendar data for the attendee, wherein the respective electronic message sent to each event attendee in the respective list of optional attendees for each session is configured to direct the calendaring application to present the attendee with an option to accept or decline participation in the session, and wherein the respective electronic message sent to each event attendee in the respective list of optional attendees for each session is configured to direct the calendaring application to access the calendar database system to schedule the allocated set of time slots for the session in the respective set calendar data for the attendee if the attendee accepts participation in the session.

* * * * *